(12) United States Patent
Hershey et al.

(10) Patent No.: US 10,592,800 B2
(45) Date of Patent: *Mar. 17, 2020

(54) NEURAL NETWORKS FOR TRANSFORMING SIGNALS

(71) Applicant: Mitsubishi Electric Research Laboratories, Inc., Cambridge, MA (US)

(72) Inventors: John Hershey, Winchester, MA (US); Jonathan Le Roux, Somerville, MA (US); Felix Weninger, Munich (DE)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 214 days.

This patent is subject to a terminal disclaimer.

(21) Appl. No.: 15/342,252

(22) Filed: Nov. 3, 2016

(65) Prior Publication Data

US 2017/0053203 A1     Feb. 23, 2017

Related U.S. Application Data

(63) Continuation of application No. 14/446,431, filed on Jul. 30, 2014, now Pat. No. 9,582,753.

(51) Int. Cl.
*G06N 3/04* (2006.01)
*G06N 20/00* (2019.01)
(Continued)

(52) U.S. Cl.
CPC ......... *G06N 3/0445* (2013.01); *G06N 3/0436* (2013.01); *G06N 3/084* (2013.01);
(Continued)

(58) Field of Classification Search
None
See application file for complete search history.

(56) References Cited

U.S. PATENT DOCUMENTS

| 8,700,552 B2 | 4/2014 | Yu et al. |
| 9,582,753 B2 * | 2/2017 | Hershey ................. G06N 3/084 |
| 2014/0067735 A1 | 3/2014 | Yu et al. |

OTHER PUBLICATIONS

Hu Yu Hen et al: "Handbook of Neural Network Signal Processing", The Journal of the Acoustical Society of America, American Institute of Physics for the Acoustical Society of America, New York, NY, us, vol. 111, No. 6, Jun. 1, 2002 (Jun. 1, 2002), pp. 2525-2526, XP012002895, ISSN: 0001-4966, DOI: 10.1121/1.1480419 the whole document.

(Continued)

*Primary Examiner* — Alan Chen
(74) *Attorney, Agent, or Firm* — Gennadiy Vinokur; James McAleenan; Hironori Tsukamoto

(57) ABSTRACT

A method for transforms input signals, by first defining a model for transforming the input signals, wherein the model is specified by constraints and a set of model parameters. An iterative inference procedure is derived from the model and the set of model parameters and unfolded into a set of layers, wherein there is one layer for each iteration of the procedure, and wherein a same set of network parameters is used by all layers. A neural network is formed by untying the set of network parameters such that there is one set of network parameters for each layer and each set of network parameters is separately maintainable and separately applicable to the corresponding layer. The neural network is trained to obtain a trained neural network, and then input signals are transformed using the trained neural network to obtain output signals.

20 Claims, 7 Drawing Sheets

(51) Int. Cl.
*G06N 3/08* (2006.01)
*G06N 7/00* (2006.01)
*G10L 15/16* (2006.01)

(52) U.S. Cl.
CPC .............. *G06N 7/005* (2013.01); *G06N 20/00* (2019.01); *G10L 15/16* (2013.01)

(56) References Cited

OTHER PUBLICATIONS

Boulanger-Lewandowski Nicolas et al: "Exploiting long-term temporal dependencies in NMF using recurrent neural networks with application to source separation", 2014 IEEE International Conference on Acoustics, Speech and Signal Processing (ICASSP), IEEE, May 4, 2014 (May 4, 2014), pp. 6969-6973, XP032618240, DOI: 10.1109/ICASSP.2014.6854951 [retrieved on Jul. 11, 2014] the whole document.

F. Weninger, J. Le Roux, J. R. Hershey, and S. Watanabe, "Discriminative NMF and its application to single-channel source separation," in Proc. of ISCA Interspeech, Sep. 2014.

K. Gregor and Y. LeCun, "Learning fast approximations of sparse coding," in ICML, 2010, pp. 399-406.

P. Sprechmann, R. Litman, T. B. Yakar, A. M. Bronstein, and G. Sapiro, "Efficient supervised sparse analysis and synthesis operators," in NIPS, 2013, pp. 908-916.

T. B. Yakar, R. Litman, P. Sprechmann, A. Bronstein, and G. Sapiro, "Bilevel sparse models for polyphonic music transcription," in ISMIR, Nov. 2013.

P. Sprechmann, A. M. Bronstein, and G. Sapiro, "Supervised non-euclidean sparse NMF via bilevel optimization with applications to speech enhancement," in HSCMA, May 2014.

J. Mairal, F. Bach, and J. Ponce, "Task-driven dictionary learning," IEEE Trans. Pattern Analysis and Machine Intelligence, vol. 34, No. 4, pp. 791-804, 2012.

John R. Hershey, Jonathan Le Roux and Felix Weninger., "Deep Unfolding: Model-Based Inspiration of Novel Deep Architecture." CoRR, 2014. http://arxiv.org/abs/1409.2574.

\* cited by examiner

NEURAL NETWORKS FOR TRANSFORMING SIGNALS

FIELD OF THE INVENTION

This invention relates generally to transforming signals, and more particularly to transforming signals using neural networks.

BACKGROUND OF THE INVENTION

Machine Learning

Two of the most successful general approaches to transforming signals, such as speech, image and video signals, are model-based methods and neural networks. Each offers important advantages and disadvantages.

Model-Based Methods

A main advantage of the model-based methods, such as probabilistic graphical models, is that models can incorporate prior knowledge and intuition to reason at the problem level in devising inference procedures. Important assumptions about problem constraints can often be incorporated into the model-based approach. Examples include constraints such as the linear additivity of audio signals, e.g. speech signals, and visual occlusion in image processing, as well as more subtle statistical assumptions such as conditional independence, latent variable structure, sparsity, low-rank covariances, and so on. By hypothesizing and testing different problem-level constraints, insight into the nature of the problem can be gained and used to improve the modeling assumptions.

Unfortunately, inference in probabilistic models can be computationally intractable. Approximate methods, such as loopy belief propagation (BP) and variational approximations can derive iterative procedures to infer the latent variables of interest. However, despite greatly improving the situation, such iterative methods are often still too slow for time-sensitive applications, such as real time speech or video processing. In such cases, rigorous discriminative optimization of the models can be challenging because they may involve bi-level optimization, where optimization of the parameters of the model depends on an iterative inference procedure.

FIG. 2A shows a prior art model-based method. An inference procedure f $200$ iterates $202$ K times on input signals $x_i$ $201$ using parameters $203$ to infer intermediate variables $\phi_i$. Then, an estimation model g $204$ is applied to obtain output $y_i$ $205$.

Neural Networks

Neural networks are formulated such that the inference is defined as a finite closed-form expression, organized into layers, which are typically executed in sequence. Typically, a neural network includes an input layer, one or more hidden layers, and an output layer. If the number of hidden layers is large, then the neural network is called a deep neural network, and the layers are learned incrementally. Discriminative training of the networks can be used to optimize speed versus accuracy trade-offs.

One well-known disadvantage is that conventional neural networks are closer to mechanisms than problem-level formulations, and can be considered essentially "black-box" methods. Therefore, it is very difficult to incorporate prior knowledge about the real world signals and the goal of the transformation into the network. Moreover, even with a working neural networks, it is often not clear how it actually achieves its results. Therefore, discovering how to modify the network to achieve better results is not straightforward.

Another example of this disadvantage is that only a limited set of activation functions that perform the computation of each layer have been investigated, and it is not clear how to choose the best activation function to solve a particular problem, or how to design a new activation function that is best suited to solve a particular problem.

SUMMARY OF THE INVENTION

Model-based methods and neural networks have both been used for transforming real world signals, e.g., transforming a speech signal to text, transforming a noisy speech signal to an enhanced speech signal, transforming a noisy image to a clean image, transforming a set of input images from different view points into a depth map, etc. The transformations can be more complex, for example, the transforming can produce a class characterizing the input signals, or recognize a pattern inherent in video signals.

In model-based methods, the knowledge about the problem domain can be expressed in the model formulae, the model parameters and variables, and the constraints on the model parameters and variables. However, inference in such methods can be difficult. Typically, the inference is performed by an iterative inference procedure that uses the model constraints, the model parameters and procedure parameters. In contrast, deterministic neural networks are constructed in such a way that the inference is straightforward, but at the expense of difficulties in incorporating the knowledge about the problem domain.

Therefore, the embodiments of the invention provide a method for processing input signals that has the advantages of model-based methods and neural networks, while avoiding many of their disadvantages. The general idea of the invention can be summarized as follows. Given a model-based approach that requires an iterative inference procedure, the iterations are unfolded into a layer-wise structure analogous to a neural network, where all layers are associated with the same set of parameters. Then, the parameters are untied by associating a different set of parameters to each layer and allowing them to be different from each other. This leads to novel neural-network-like architectures with novel activation functions, that can easily be trained discriminatively using gradient-based methods.

The resulting method combines the expressive power of the neural network with the internal structure of the model-based approach, while allowing inference to be performed in a number of layers whose parameters can be optimized for best performance.

This framework can be applied to a number of model-based methods. In particular, it can be applied to non-negative matrix factorization (NMF) to obtain a novel non-negative neural network architecture, that can be trained with a multiplicative back-propagation-style update procedure. The method can also be applied to loopy belief propagation (BP) for Markov random fields, or variational inference procedures for intractable generative models.

A specific embodiment is for solving a real world speech enhancement problem, where the resulting neural network outperforms a conventional neural network while only requiring a fraction of the number of the parameters. We believe this is due to the ability to incorporate problem level assumptions into the architecture of our neural network with novel activation functions.

DETAILED DESCRIPTION OF THE PREFERRED EMBODIMENTS

Figure 1:
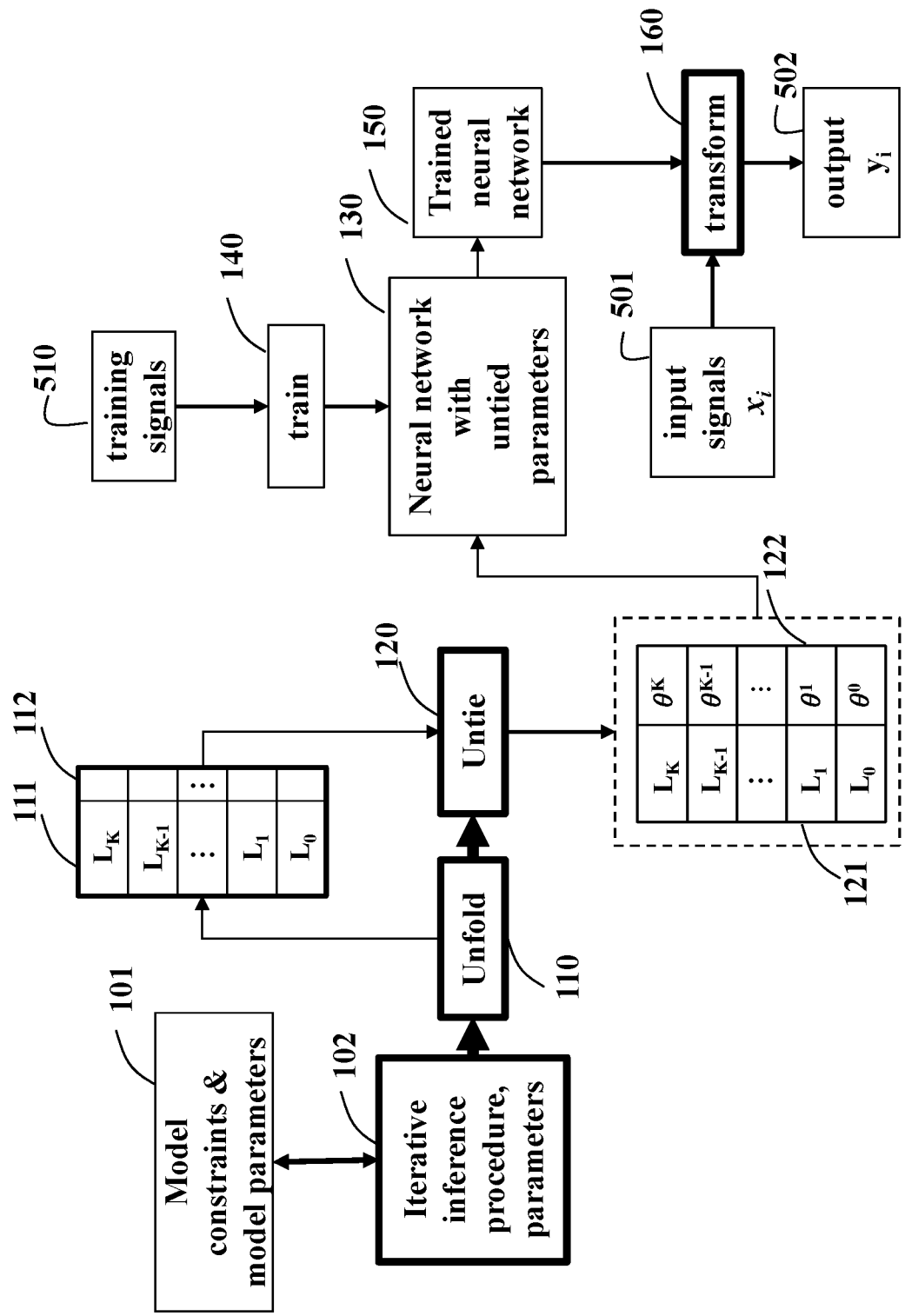
FIG. 1 is a flow diagram of a method for transforming input signals using a neural network according to embodiments of the invention.

As shown in FIG. 1, the embodiments of our invention provide a method for transforming an input signal using a neural network obtained from an iterative inference procedure.

A model 101 with constraints and model parameters is used to derive an iterative inference procedure 102, which makes use of corresponding procedure parameters, as well as the model parameters. The iterative inference procedure and parameters are unfolded 110. The unfolding converts each iteration of the iterative inference procedure into a layer-wise structure analogous to a neural network with a set of layers $L_k$ 111, k=0, . . . , K where K is a number of iterations in the iterative inference procedure, and a set of network parameters θ 112. It is understood that the same set of network parameters is used by each layer, i.e., modifying the set of parameters modifies the operations of all layers in the same way. Equivalently, each layer can be considered to have its own set of parameters, but these sets of parameters are tied to each other. Using the conventional approach, the layers $L_0, \ldots, L_k$ are shown in a bottom to top manner, from the input layer, to the hidden layers, to the output layer.

The invention is based in part on the realization that having the network layers 111 share the same set of parameters 112 is a severe restriction on the flexibility of the network to solve a given problem.

Therefore, in step 120, the sets of parameters are untied so that the sets of parameters can be different for each layer, and each layer 121 is now associated with a separately maintainable set of parameters 122, therefore leading to the novel neural network 130. It is understood that the dimensions, ordering and meaning of the sets of parameters are the same. For example, each set is a vector of N variables.

By untying the sets parameters from each other, the sets of parameters can be individually tuned for each layer. This can improve the quality of the model, and as a result improve speed vs. accuracy trade-offs during operation. The untying and maintenance of the untied parameters is non-trivial as described in greater detail below.

The neural network 130 can now be trained 140 discriminatively using, e.g., gradient-based methods and training data 510, by individually adjusting the sets of parameters 122.

Figure 5:
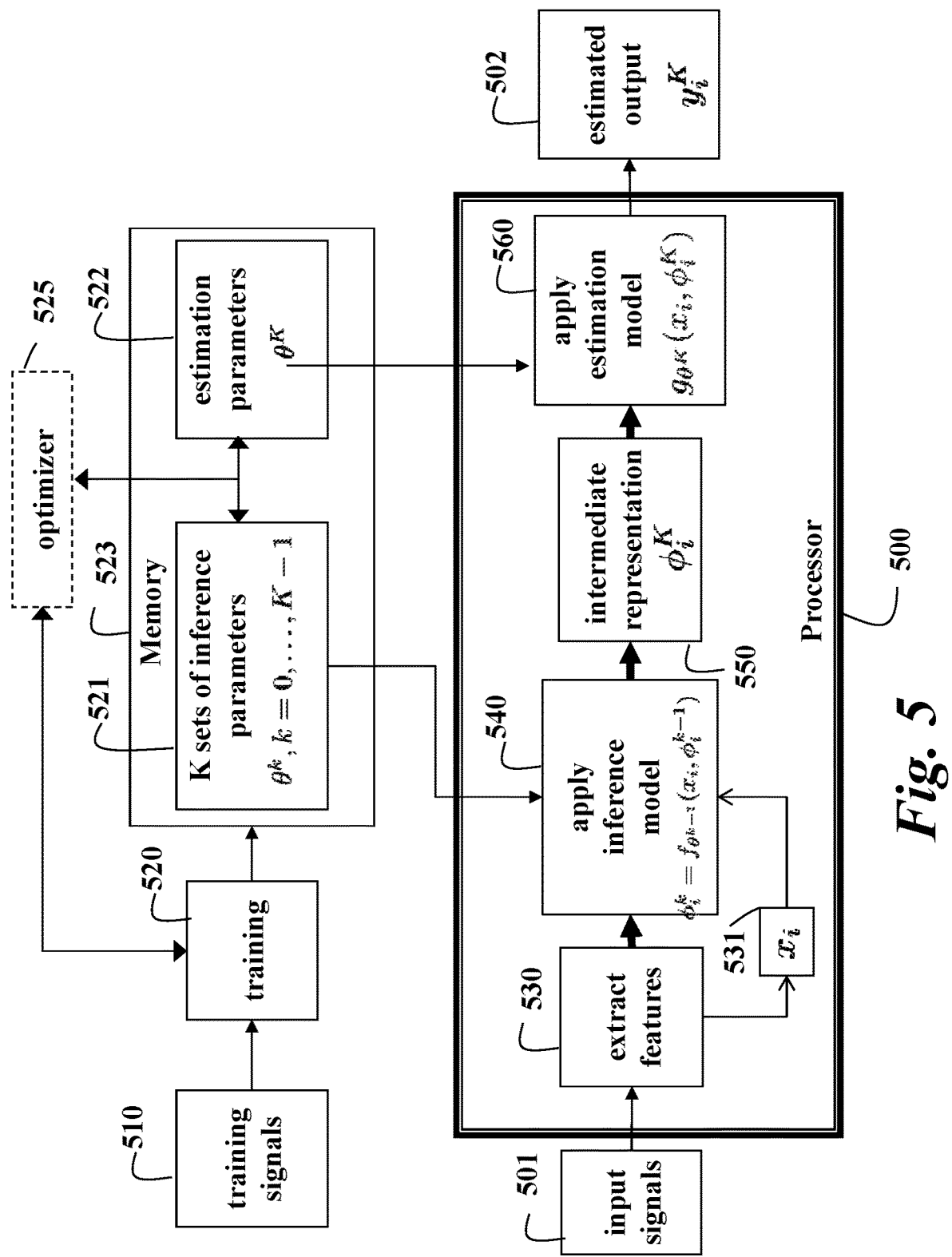
FIG. 5 is a flow diagram of a method for training and testing with the neural network of FIG. 2B.

The trained neural network 150 can now transform 160 input signal $x_i$ 501 to obtain an output is $y_i$ 502, as shown in FIG. 5. The input signals can be obtained by various sensors, e.g., microphones, cameras, motion sensors, and the like.

The steps can be performed in one or more processors connected to memory and input/output interfaces as known in the art. It is understood that signals, such as audio and video, processed by a processor are typically acquired by sensors and converted to digital data by an analog-to digital converter.

Example Iterative Models

We consider models for which the inference is an optimization problem. One example is variational inference, where a lower bound on a likelihood of the input is optimized to estimate approximate posterior probabilities, which can be used to determine conditional expected values of hidden quantities.

As another example, loopy belief propagation (BP) is also an iterative procedure that enforces local consistency constraints on marginal posterior probabilities. When the procedure converges, fixed points correspond to stationary points of the Bethe variational free energy.

In another example, non-negative matrix factorization (NMF) is a non-negative basis function expansion model, whose objective function can be optimized by simple multiplicative update rules.

All of these models, as well as many others, can be used by the invention to generate corresponding novel deep unfolding neural networks.

Unfolding and Untying

Figure 2A:
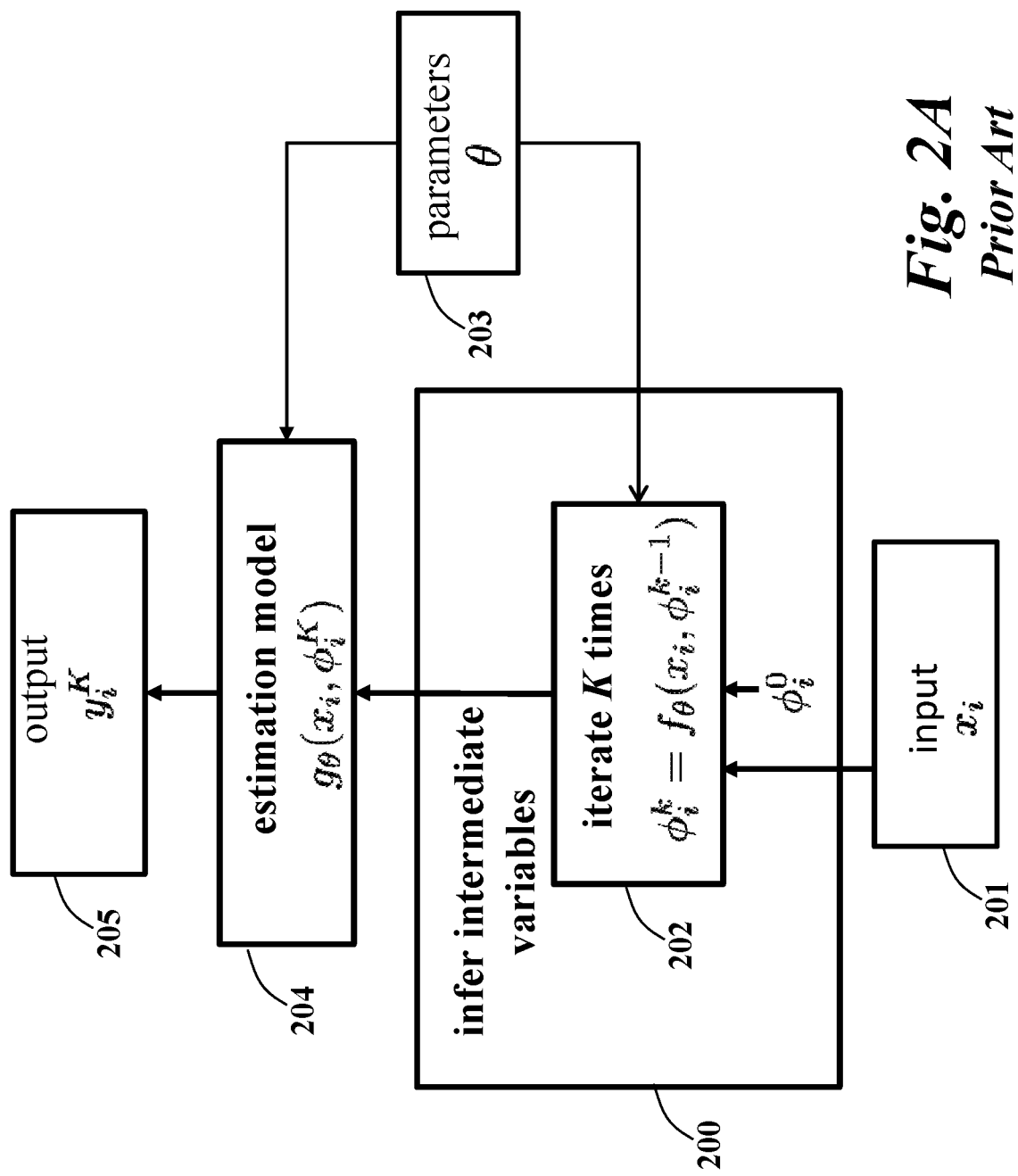
FIG. 2A is a flow diagram of a prior art model-based method.
Figure 2B:
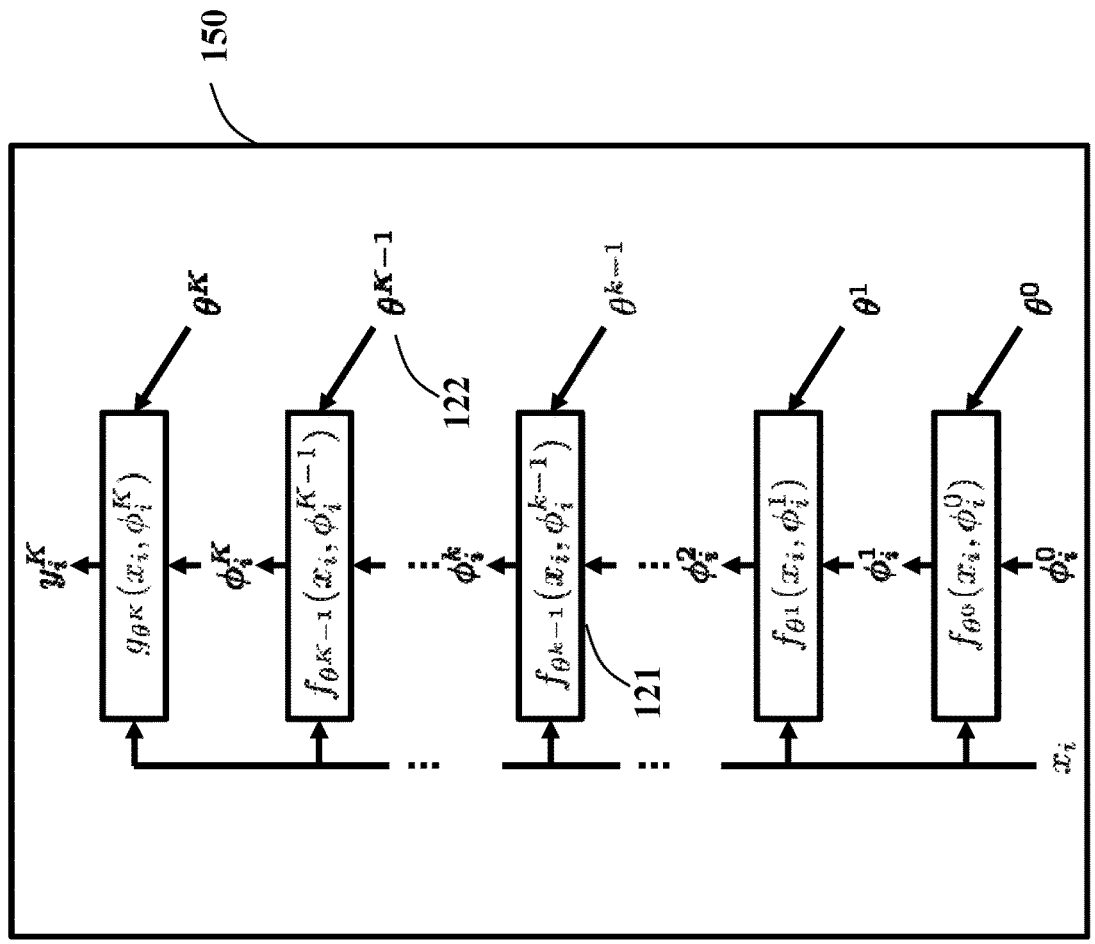
FIG. 2B is a block diagram of the neural network of FIG. 1 according to embodiments of the invention.

As shown in FIG. 2B, we describe a general formulation based on a model, determined by the sets of parameters θ 122 that specify relationships between hidden quantities of interest (output) $y_i$ 502 and the observed variables (input) $x_i$ 501 for each data instance i.

During the transformation 160 of the input $x_i$, estimating the output $y_i$ 502 involves optimizing an inference objective function $\mathcal{F}_\theta(x_i, \phi_i)$, where $\phi_i$ are intermediate variables, considered as vectors, from which the output $y_i$ can be determined as $$\hat{\phi}_i(x_i \mid \theta) = \operatorname*{argmin}_{\phi_i} \mathcal{F}_\theta(x_i, \phi_i), \tag{1}$$

$$\hat{y}_i(x_i \mid \theta) = g_\theta(x_i, \hat{\phi}_i(x_i \mid \theta)),$$

where $g_\theta$, a top or output layer of the neural network, is an estimator or reconstruction model for $y_i$. We can arbitrarily formulate the optimization as a minimization, as in the case of energy minimization, but equivalently the optimization can be a maximization as in the case of probabilities. For many interesting cases, this optimization is difficult and leads to an iterative inference procedure.

In probabilistic generative models, the objective function $\mathcal{F}$ can be an approximation to the negative log likelihood, $y_i$ can represent hidden quantities, and $\phi_i$ represent an estimate of the posterior distribution of the hidden quantities. For example, in variational inference procedures, $\phi_i$ can be variational parameters. In sum-product loopy belief propagation, $\phi_i$ are posterior marginal probabilities. In another example for a non-probabilistic formulation of NMF, $\phi_i$ can be activation coefficients of basis functions that are updated at inference time. The $x_i, y_i$ can be sequences or have other underlying structures, which are ignored in this description for simplicity.

The model parameters in the model-based approach could be trained using a discriminative objective function $$\varepsilon_\theta \stackrel{\text{def}}{=} \Sigma_i D(y_i^*, \hat{y}_i(x_i \mid \theta)), \tag{2}$$

where D is a loss function, and $y_i^*$ a reference value. In some settings, a discriminative objective $\tilde{\varepsilon}_\theta \stackrel{\text{def}}{=} \Sigma_i D(y_i^*, \hat{\phi}_i(x_i \mid \theta))$, which determines an expected loss, could also be considered.

In the general case, equation (2) is a bi-level optimization problem because $\hat{y}_i(x_i|\theta)$ is determined by the optimization problem in equation (1), which depends on the parameters θ. The intermediate variables $\phi_i$ in equation (1) can be optimized iteratively using update steps k ∈{1 ... K} of the form $$\phi_i^k = f_\theta(x_i, \phi_i^{k-1}), \quad (3)$$

beginning with $\phi_i^0$. Indices k in superscripts refer to iteration indices, and are not to be interpreted as exponents.

Although all steps are assumed to use the same $f_\theta$, the steps can be composed of different smaller steps. This can occur in loopy belief propagation when different subsets of messages are passed in each step, or in variational inference, when different subsets of variational parameters are updated in each step.

Unfolding

Rather than considering the iterations as a procedure, we unfold 110 the procedure 102 as a sequence of layers 111 in a neural network-like architecture, where the iteration index is now interpreted as an index to the neural network layer. The intermediate variables $\phi^1, \ldots, \phi^K$ are the nodes of layers 1 to K and equation (3) determines the transformation and activation function between the layers. The hidden quantities $y_i^K$ are the nodes of the output layer, which are obtained by $$y_i^K = g_\theta(x_i, \phi_i^K),$$

where g is the reconstruction function.

Untying

We realize that using the same parameters 112 for all layers is not necessary in the context of discriminative training, and can even be detrimental to performance.

Therefore, we explicitly untie 120 the parameters 122 from each other across the layers 121 to form the much improved neural network 130. In addition to allowing the network to fit more complex functions, we believe the untying can also reduce the susceptibility to local minima.

To formulate this untying, we define sets of parameters $\theta \stackrel{\text{def}}{=} \{\theta^k\}_{k=0}^K$ 122, where each $\theta^k$ is a set of parameters for the layer k 121, so that $\phi_i^k = f_{\theta^{k-1}}(x_i, \phi_i^{k-1})$, and $y_i^K = g_{\theta^K}(x_i, \phi_i^K)$ in the top layer.

During the training 140, we can individually and separately optimize one or more of the sets of parameters $\theta^k$ in θ 122 using the discriminative objective function $\varepsilon_\theta$ in (2) above, or the discriminative objective function $\bar{\varepsilon}_\theta$ determining an expected loss.

We can determine the derivatives recursively using backpropagation $$\frac{\partial \varepsilon}{\partial \phi_i^K} = \frac{\partial \mathcal{D}}{\partial y_i^K} \frac{\partial y_i^K}{\partial \phi_i^K}, \quad (4)$$

$$\frac{\partial \varepsilon}{\partial \theta^K} = \sum_i \frac{\partial \mathcal{D}}{\partial y_i^K} \frac{\partial y_i^K}{\partial \theta^K},$$

$$\frac{\partial \varepsilon}{\partial \phi_i^k} = \frac{\partial \varepsilon}{\partial \phi_i^{k+1}} \frac{\partial \phi_i^{k+1}}{\partial \phi_i^k}, \quad (5)$$

$$\frac{\partial \varepsilon}{\partial \theta^k} = \sum_i \frac{\partial \varepsilon}{\partial \phi_i^{k+1}} \frac{\partial \phi_i^{k+1}}{\partial \phi^k},$$

where k<K. We sum over all the intermediate indices of the derivatives. The specific derivations depend on the form of f, g and D, for which we give examples below.

Note that we can optionally place some constraints on the sets of parameters $\theta^k$ across layers. In particular, we can assume that some subsets of parameters are coupled, either through a hard tying, i.e., their values are assumed to be equal across layers inside each subset, or through a smooth coupling, for example by using a penalty function ensuring that their values across layers inside each subset are close to each other.

Initial values for the parameters may be obtained by a variety of means, such as by randomization, by setting the values to some predefined values, or by using a training procedure for the original model-based approach with tied parameters. After initialization, some subsets of the parameters may be trained, and other parameters held to their initial value.

Neural Network Discriminative Non-Negative Matrix Factorization

Figure 3:
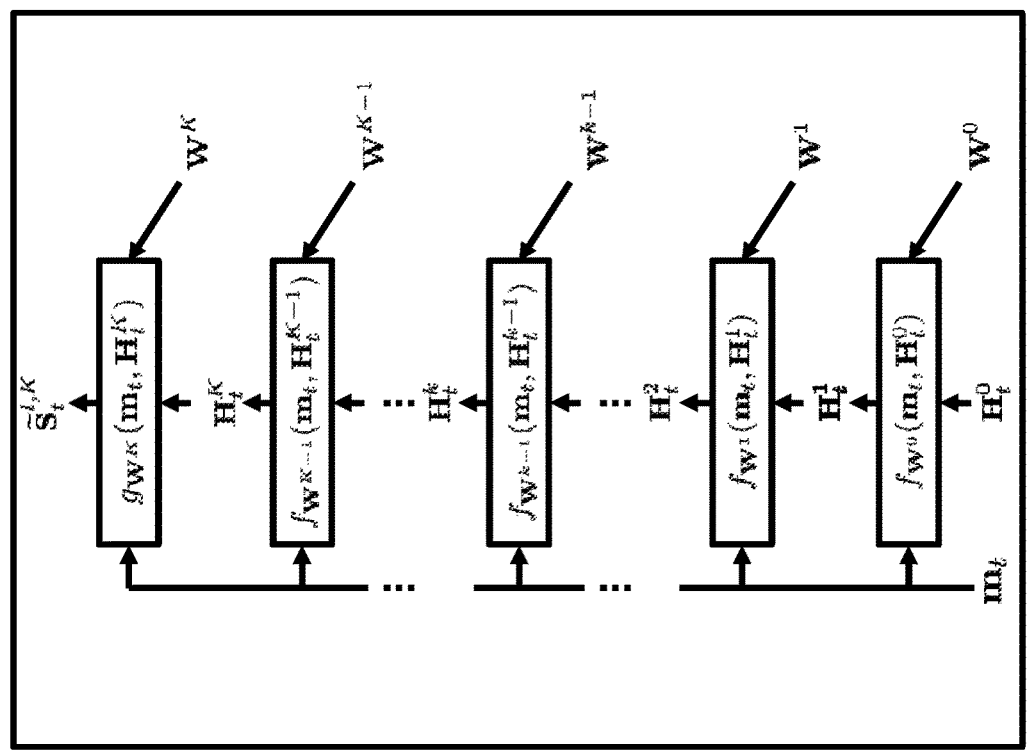
FIG. 3 is a block diagram of a neural network, according to embodiments of the invention, for a non-negative matrix factorization (NMF) model.

In one embodiment as shown in FIG. 3, we create a novel neural network from a non-negative matrix factorization (NMF) model. This novel neural network can be applied to any real world non-negative signal. Although NMF can be applied in many domains, here we focus on the real world task of single-channel source separation, which aims to recover source signals from mixtures of signals, e.g., audio (speech) signals. In this context, the model encompasses the problem-level assumptions that power or magnitude spectra of different source signals approximately add up to the mixture, and that, at each time instance, the features of each source can be described as a linear combination of non-negative basis functions.

NMF operates on a matrix of F-dimensional non-negative spectral features, usually the power or magnitude spectrogram of the mixture $M = [m_1 \ldots m_T]$, where T is the number of frames and $m_t \in \mathbb{R}_+^F$, t=1, ..., T are obtained by short-time Fourier transformation of the time-domain signal. With L sources, a set of $R_l$ non-negative basis vectors $w_1^l, \ldots, w_{R_l}^l$ is assumed for each source l ∈{1, ..., L}. Indices l in superscripts refer to the source index, and are not to be interpreted as exponents. The basis vectors are concatenated into matrices $W^l = [w_1^l \ldots w_{R_l}^l]$. A column-wise normalized $$\tilde{W}^l = \left[ \frac{w_1^l}{\|w_1^l\|} \ldots \frac{w_{R_l}^l}{\|w_{R_l}^l\|} \right]$$

can be used to avoid scaling indeterminacy. The basic assumptions can then be written as $$M \approx \Sigma_l S^l \approx \Sigma_l \tilde{W}^l H^l = \tilde{W} H, \quad (6)$$

where $H^l$ is an activation matrix for source l, and H is a vertical concatenation of the activation matrices for each source $H^1, \ldots, H^L$.

The β-divergence $D_\beta$ is an appropriate cost function for this approximation, which casts inference as an optimization of H as $$H = \arg\min_H D_\beta(M | \tilde{W} H) + \mu |H|_1. \quad (7)$$

For β=1, $D_\beta$ is the generalized Kullback-Leibler divergence (KL) divergence, whereas β=2 yields the squared Euclidean distance. An L1 sparsity constraint with weight μ is added to favor solutions where only few basis vectors are active at a time.

The following multiplicative updates minimize equation (7) subject to non-negativity constraints $$H^{k+1} = H^k \circ \frac{\tilde{W}^T (M \circ (\Lambda^k)^{\beta-2})}{\tilde{W}^T (\Lambda^k)^{\beta-1} + \mu}, \quad (8)$$

for iteration k ∈1, ..., K, where ∘ denotes element-wise multiplication, T as a superscript denotes transposition, the matrix quotient is computed element-wise, and we define $\Lambda^k := \tilde{W} H^k$. $H^0$ can be initialized randomly or with all values set to a non-zero constant. After K iterations, a Wiener filtering-like approach can be used to reconstruct each source, which enforces the constraint that all the source estimates $\tilde{S}^{l,K}$ add up to the mixture $$\tilde{S}^{l,K} = \frac{\tilde{W}^l H^{l,K}}{\sum_{l'} \tilde{W}^{l'} H^{l',K}} \circ M. \quad (9)$$

In general, the NMF bases are trained independently on each source before the bases are combined. However, in the conventional NMF framework, the combination is not trained discriminatively for good separation performance from a mixture.

Discriminative methods can also be applied to sparse dictionary based methods to achieve better performance in particular applications. In a similar way, we can discriminatively train NMF bases for source separation. The following optimization problem for training bases is called discriminative NMF (DNMF):

$$W = \arg\min_W \Sigma_l \gamma_l D_\beta(S^l | W^l \hat{H}^l(M, W)), \quad (10)$$

where $\hat{H}(M,W) = \arg\min_H D_\beta(M|\tilde{W}H) + \mu|H|_1, \quad (11)$ and $\gamma_l$ are weights accounting for the application-dependent importance of the source l.

For example, in speech de-noising, we focus on reconstructing the speech signal from a noisy mixture. The first part in equation (10) minimizes the reconstruction error given $\hat{H}$. The second part in equation (11) ensures that $\hat{H}$ are the activations that arise from the test-time inference objective. Given the bases W, the activations $\hat{H}(M, W)$ are uniquely determined, due to the convexity of equation (11). Nonetheless, the above is a difficult bi-level optimization problem, because the bases W occur in both levels.

The bi-level problem can be approached by directly solving for the derivatives of the lower level problem after convergence. Alternatively, the problem can be approached by untying the bases used for reconstruction in equation (10) from the analysis bases used in equation (11), and training only the reconstruction bases. In addition, equation (9) can be incorporated into the objective function (10), leading to $$W = \arg\min_W \Sigma_l \gamma_l D_\beta(S^l | \tilde{S}^{l,K}(M, W)). \quad (12)$$

This model is a special, limited, case of our invention in the context of NMF.

Based on our framework, we unfold 110 the entire model as a non-negative neural network 130, and we untie 120 the parameters across layers as $W^k$ for $k \in \{1 \ldots K\}$. We cast this into our general formulation by defining:
- i=t, where i indexes the times steps t,
- x=m, where x is the mixture m, and in particular $x_i = m_t$,
- y*=$S^l$, where y* is a reference value,
- $\phi^k = H^k$, where $\phi^k$ are intermediate variables,
- $y^K = \tilde{S}^{l,K}$, where $y^K$ is the output, and
- $\theta^k = W^k$, where the parameters $\theta^k$ are the bases $W^k$.

We identify the inference objective and estimator of equation (1) with equation (11) and equation (9), the discriminative objective in equation (2) with equation (12), and the iterative updates in equation(3) with equation (8).

To train 140 the neural network 130, while respecting the non-negativity constraints, we derive recursively defined multiplicative update equations by back-propagating a decomposition between positive and negative parts of the gradient. In NMF, multiplicative updates are often derived using the ratio of the negative part to the positive part of a decomposition of the gradient in a difference of two non-negative terms, as a multiplication factor to update the value of that variable of interest:

$$W^{k+1} = W^k \circ \frac{[\nabla_{W^k}\varepsilon]_-}{[\nabla_{W^k}\varepsilon]_+}, \quad (13)$$

where $[\nabla_{W^k}\varepsilon]_+$ and $[\nabla_{W^k}\varepsilon]_-$ are non-negative and verify $\nabla_{W^k}\varepsilon = [\nabla_{W^k}\varepsilon]_+ - [\nabla_{W^k}\varepsilon]_-$. Note that this decomposition is in general not unique. We can recursively obtain such decompositions at each layer by propagating positive and negative parts across layers, starting at the top layer. To propagate the positive parts, we use $$\left[\frac{\partial \varepsilon}{\partial h_{r_k,t}^k}\right]_+ = \sum_{r_{k+1}} \left( \left[\frac{\partial \varepsilon}{\partial h_{r_k,t}^{k+1}}\right]_+ \left[\frac{\partial h_{r_k,t}^{k+1}}{\partial h_{r_k,t}^k}\right]_+ + \left[\frac{\partial \varepsilon}{\partial h_{r_{k+1},t}^{k+1}}\right]_- \left[\frac{\partial h_{r_{k+1},t}^{k+1}}{\partial h_{r_k,t}^k}\right]_- \right), \quad (14)$$

$$\left[\frac{\partial \varepsilon}{\partial w_{f,r}^k}\right]_+ = \quad (15)$$

$$\sum_t \sum_{r_{k+1}} \left( \left[\frac{\partial h_{r_{k+1},t}^{k+1}}{\partial h_{r_k,t}^k}\right]_+ \left[\frac{\partial \varepsilon}{\partial h_{r_{k+1},t}^{k+1}}\right]_+ + \left[\frac{\partial h_{r_{k+1},t}^{k+1}}{\partial w_{f,r}^k}\right]_- \left[\frac{\partial \varepsilon}{\partial h_{r_{k+1},t}^{k+1}}\right]_- \right).$$

To propagate the negative parts, we use $$\left[\frac{\partial \varepsilon}{\partial h_{r_k,t}^k}\right]_- = \sum_{r_{k+1}} \left( \left[\frac{\partial \varepsilon}{\partial h_{r_k,t}^{k+1}}\right]_- \left[\frac{\partial h_{r_k,t}^{k+1}}{\partial h_{r_k,t}^k}\right]_- + \left[\frac{\partial \varepsilon}{\partial h_{r_{k+1},t}^{k+1}}\right]_+ \left[\frac{\partial h_{r_{k+1},t}^{k+1}}{\partial h_{r_k,t}^k}\right]_+ \right), \quad (15)$$

$$\left[\frac{\partial \varepsilon}{\partial w_{f,r}^k}\right]_- = \quad (16)$$

$$\sum_t \sum_{r_{k+1}} \left( \left[\frac{\partial h_{r_{k+1},t}^{k+1}}{\partial w_{f,r}^k}\right]_+ \left[\frac{\partial \varepsilon}{\partial h_{r_{k+1},t}^{k+1}}\right]_- + \left[\frac{\partial h_{r_{k+1},t}^{k+1}}{\partial w_{f,r}^k}\right]_- \left[\frac{\partial \varepsilon}{\partial h_{r_{k+1},t}^{k+1}}\right]_+ \right).$$

Recurrent Neural Network Discriminative NMF

Figure 4:
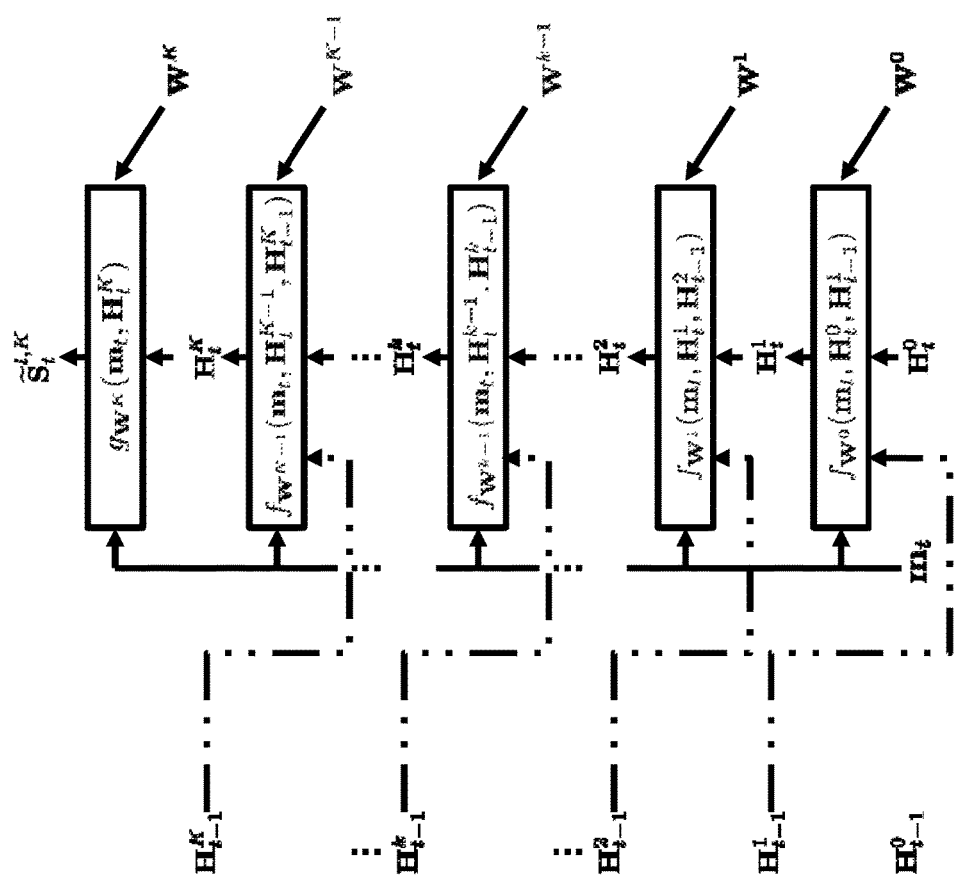
FIG. 4 is a block diagram of a recurrent neural network derived from the neural network of FIG. 3 according to embodiments of the invention.

After the neural network 130 according to the invention has been obtained, the network can be extended, as shown in FIG. 4, to form a recurrent structure. In this case, the activation matrix $H_{t-1}^{k+1}$ at the output of layer k and at the previous time frame t−1 is included as an input to the layer k at time frame t. One example of a way to include $H_{t-1}^{k+1}$ as input to the layer k at time frame t is to vertically concatenate $H_{t-1}^{k+1}$ and $H_t^k$ and to consider an expanded $W^k = [W_{previous}^k, W_{current}^k]$ such that $W_{previous}^k$ applies to $H_{t-1}^{k+1}$ and $W_{current}^k$ applies to $H_t^k$, for each layer k, using the same type of update equations as for the neural network discriminative non-negative matrix factorization to compute $H_t^{k+1}$.

General Training and Transforming

FIG. 5 shows the details for a general method for the training 140 and transforming 160 of FIG. 1. The training 520 begins with training signals 510, perhaps digitized. The training generates K sets of inference parameters 521, one for each level, and estimation parameters parameters $\theta^K$ 522 stored in a memory 523. The parameters can be optimized 525 during the training.

The transforming extracts 530 features 531 from input signals 501. An inference model $\phi_i^k = f_{\theta^{k-1}}(x_i, \phi_i^{k-1})$, k=1, . . . , K, as described above, is applied 540 to the features to obtain an intermediate representation 550. Then, an estimation model $y_i^K = g_\theta(x_i, \phi_i^K)$, as described above, is applied to the intermediate representation to estimate the output $y_i^K$.

Training and Testing for DDNMF and RDDNMF

Figure 6:
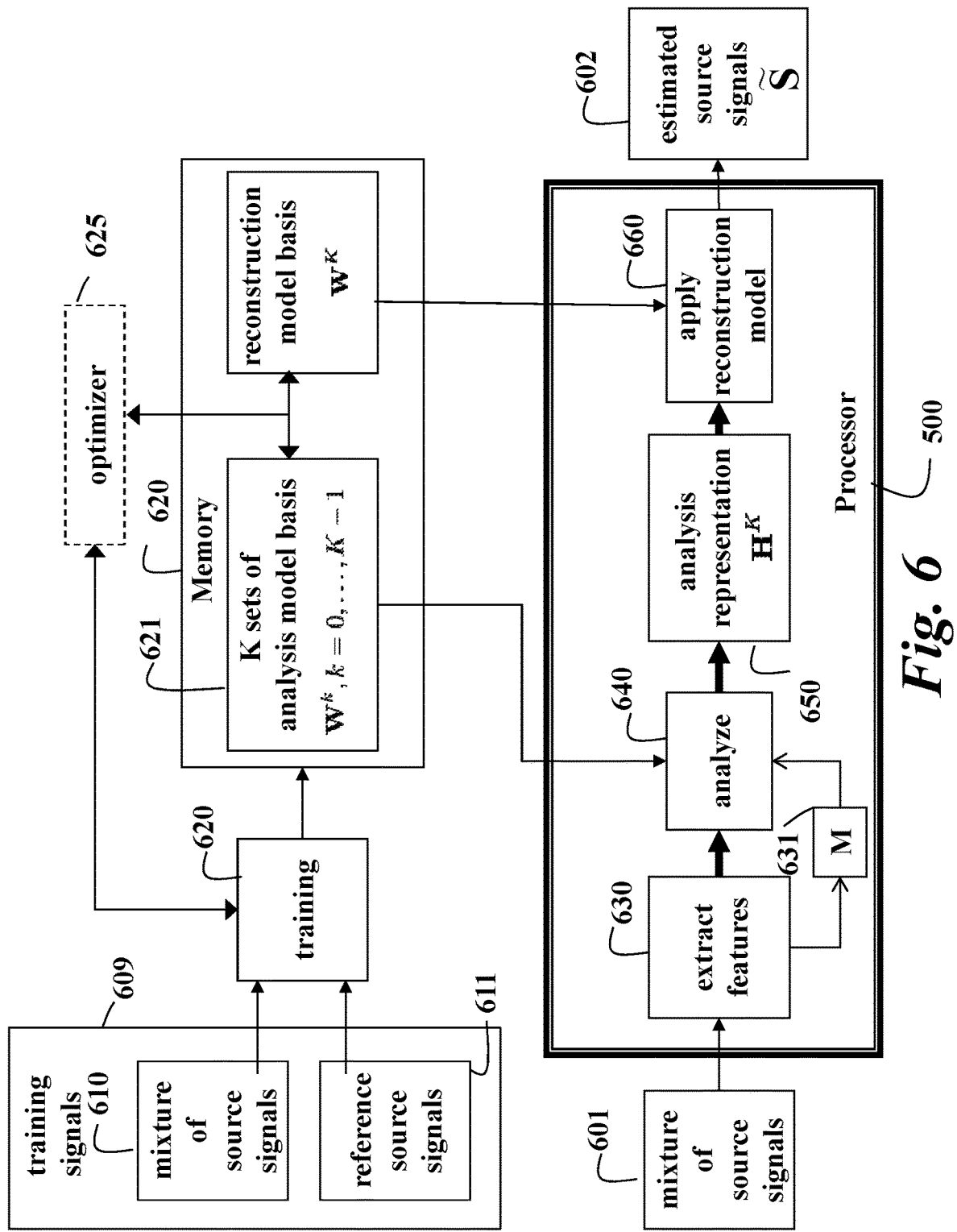
FIG. 6 is a flow diagram of a method for training and testing with the neural networks of FIG. 3 and FIG. 4.

FIG. 6 shows the details for a method for the training 140 and transforming 160 of neural network discriminative NMF and recurrent neural network discriminative NMF as described above. The training 620 begins with training signals 609, where each sample includes a mixture of source signals 610 and the corresponding reference source signals 611. The training generates K sets of analysis model basis $W^k$, k=0, . . . , K−1 621, one for each layer, and reconstruction model basis $W^K$ 622 stored in a memory 623. The parameters can be optimized 625 during the training.

The transforming extracts 630 features 631 from test signals 601 in the form of a mixture of the source signals, which are analyzed 640 to generate an analysis reconstruction representation 650. Then, a reconstruction model is applied to the analysis representation to estimate the output source signals g.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for transforming input signals, comprising:
    selecting from a memory a neural network, wherein the neural network includes a set of layers, wherein an activation function of each layer is equivalent to a corresponding iteration of an iterative inference procedure of a generative model, wherein the same set of network parameters is reused by all layers, such that dimensions, ordering, and meaning of parameters are the same for all layers, wherein the iterative inference procedure includes one or combination of a variational inference, a belief propagation, and multiplicative updates, and wherein values of the set of network parameters of at least one layer are different from values of the set of network parameters of at least one other layer; and
    transforming the input signals using the neural network to obtain output signals, wherein the steps are performed in a processor operatively connected to the memory.

2. The method of claim 1, wherein the model is a probabilistic generative model and the inference procedure is variational inference, and further comprising
    optimizing a lower bound on a likelihood of the input signals to obtain approximate posterior probabilities.

3. The method of claim 1, wherein the model is a Markov random field and the inference procedure is loopy belief propagation (BP) that enforces local consistency constraints on marginal posterior probabilities.

4. The method of claim 1, wherein the model is a non-negative basis function expansion model and the inference procedure is based on multiplicative updates.

5. The method of claim 1, wherein the sets of parameters specify relationships between the output signals and the input signals.

6. The method of claim 5, further comprising:
    obtaining the output signals by optimizing an inference objective function involving intermediate variables from which the output signals can be determined.

7. The method of claim 6, wherein the inference objective function is an approximation to a log likelihood.

8. The method of claim 6, wherein the intermediate variables are variational parameters of a variational inference procedure.

9. The method of claim 6, wherein the intermediate variables are posterior marginal probabilities of a loopy belief propagation procedure.

10. The method of claim 6, wherein the intermediate variables are activation coefficients of basis functions.

11. The method of claim 1, wherein the sets of network parameters specify relationships between the input signals and the output signals, and the adjusting optimizes the sets of network parameters using a discriminative objective function involving a loss function that takes as argument a reference value and estimated output signals.

12. The method of claim 11, wherein the optimizing is based on a gradient-descent implemented by back-propagation of gradients from higher layers to lower layers.

13. The method of claim 11, wherein one or more of the network parameters are non-negative, and the optimizing is based on multiplicative updates.

14. The method of claim 13, wherein the multiplicative updates are based on a ratio of a negative part to a positive part of a decomposition of the gradient in a difference of two non-negative terms, and the decomposition is obtained by back-propagation of the positive and negative parts of the decomposition of the gradient of a higher layer.

15. The method of claim 1, wherein the input signals are noisy speech and the output signals are clean speech.

16. The method of claim 1, wherein the input signals are a mixture of signals and the output signals are one or more source signals.

17. The method of claim 1, wherein the neural network is extended by using one neural network for each element of a set of data instances and adding connections between one or more layers of one or more neural networks.

18. The method of claim 17, wherein the set of data instances is a sequence, and the resulting neural network is a recurrent neural network.

19. The method of claim 18, wherein the set of data instances is an array.

20. A system for transforming input signals, comprising:
    a memory configured to store a neural network including a set of layers, wherein an activation function of each layer is equivalent to a corresponding iteration of an iterative inference procedure of a generative model, wherein the same set of network parameters is reused by all layers, such that dimensions, ordering, and meaning of parameters are the same for all layers, wherein the iterative inference procedure includes one or combination of a variational inference, a belief propagation, and multiplicative updates, and wherein values of the set of network parameters of at least one layer are different from values of the set of network parameters of at least one other layer; and
    a processor configured to select the neural network from the memory and to transform the input signals using the neural network to obtain output signals.

* * * * *